(12) United States Patent
Donner et al.

(10) Patent No.: US 7,085,082 B2
(45) Date of Patent: Aug. 1, 2006

(54) OBJECTIVE PIVOTING DEVICE HAVING CROSSED SWIVELLING AXES

(76) Inventors: Wilfried Donner, Kantstrasse 8, 33615 Bielefeld (DE); Bernd Donner, Schopenhauerstrasse 24, 66111 Saarbrücken (DE)

( * ) Notice: Subject to any disclaimer, the term of this patent is extended or adjusted under 35 U.S.C. 154(b) by 10 days.

(21) Appl. No.: 10/501,470

(22) PCT Filed: Jan. 10, 2003

(86) PCT No.: PCT/EP03/00159

§ 371 (c)(1),
(2), (4) Date: Jan. 13, 2005

(87) PCT Pub. No.: WO03/058340

PCT Pub. Date: Jul. 17, 2003

(65) Prior Publication Data

US 2005/0117230 A1    Jun. 2, 2005

(30) Foreign Application Priority Data

Jan. 14, 2002  (DE) ............................... 102 01 200

(51) Int. Cl.
*G02B 7/02* (2006.01)
(52) U.S. Cl. ................. 359/822; 359/813; 359/811; 359/819
(58) Field of Classification Search ........ 359/811, 359/813, 819, 822, 823, 200
See application file for complete search history.

(56) References Cited

U.S. PATENT DOCUMENTS

| 4,088,396 | A | 5/1978 | Edelstein |
| 5,502,598 | A | 3/1996 | Kimura et al. |
| 5,907,730 | A | 5/1999 | Tseng et al. |
| 6,859,325 | B1* | 2/2005 | Kato et al. .................. 359/618 |
| 6,947,228 | B1* | 9/2005 | Kato .......................... 359/813 |
| 2005/0024750 | A1* | 2/2005 | Kato .......................... 359/813 |

FOREIGN PATENT DOCUMENTS

DE       19715451       12/1998

* cited by examiner

*Primary Examiner*—Ricky Mack
*Assistant Examiner*—Brandi Thomas
(74) *Attorney, Agent, or Firm*—Browdy and Neimark, PLLC (57) ABSTRACT

The invention relates to an objective pivoting device (1) for pivoting an objective which is concentrically arranged in said device, about two perpendicular swiveling axes (A—A; M—M) which cross each other at a common apex in the optical axis of the objective. The inventive device comprises pivoting adjustment means (20, 21) which are respectively provided with a cable drive having three cable sections (20A–20C; 21A–21C), the first cable section (20A, 21A) extending from an adjustment axle coil (22A, 23A) to the first of the bearing elements (15, 40), the second section (20B, 21B) extending from said first bearing element to a second bearing element (15, 40) which is coaxial in relation to the first, and the third cable section (20C, 21C) returning from said second bearing element to a second coil (22B, 23B) of the adjustment axle (22C, 23C) of the pivoting adjustment means (20, 21).

17 Claims, 6 Drawing Sheets

OBJECTIVE PIVOTING DEVICE HAVING CROSSED SWIVELLING AXES

The invention is concerned with a pivoting device for pivoting an objective concentrically arranged therein, about two mutually perpendicular swiveling axes that cross each other at a point of intersection on the optical axis of the objective, wherein the objective is held in an objective holder, and the same is supported pivoting in bearings in two degrees of freedom of a spherical surface and these bearings are disposed on a stationary holding frame on which two pivoting adjustment means are provided, one of which is operatively linked with meridionally diametrical bearing elements, and the other one with equatorially diametrical bearing elements of the objective holder in each case, the latter having a compensating degree of freedom.

A pivoting device of this type is known from WO98/47034. The relatively large, thin annular gears and toothed segments, which are used as pivoting adjustment means, are very expensive to produce due to the fact that a high degree of precision and good gliding properties are required.

Additionally, a pivoting device is known from U.S. Pat. No. 5,502,598 A. The spherical objective holder is supported on its spherical surface. This objective holder incorporates a meridionally oriented toothed segment drive and, located orthogonal to it, an equatorial toothed segment drive, the toothed segment of which is located on a spherical segment that is pivotable about the shaft of the equatorial drive and the swiveling axis of which is displaceable in a channel located in a meridional plane in the spherical segment. The driving pinion may be implemented conically complementary to the toothed segment, and the gearwheel shaft is guided in an equatorial channel on the spherical segment. The drive moment of the gearwheel on the toothed segment produces, in dependence upon its direction, an outward displacement of the spherical segment in the channel in each case, so that no unique relationship exists between the meridional and equatorial objective pivoting movement and the adjustment rotations of the two drives, which is sufficient for the purpose of an objective panning, but insufficient for a specific camera objective adjustment.

Additionally, from DE 296 096 U1, a camera adjustment system is known, wherein a cylindrical bearing is provided at the foot of an objective frame for pivoting the frame about an axis that crosses the objective axis, and wherein on the supported cylinder section a pivot bearing about a vertical axis is provided, which intersects with the other swiveling axis in the optical axis. Because of the large distance of the pivot bearings from the optical axis, the bellow adjoining the objective carrier during major pivoting movements of the same often interferes with the beam path, and additionally the bellow is subjected to significant mechanical stress due to a kinking that occurs in the process. Preventing this oftentimes requires re-adjusting the entire camera system. These problems are particularly severe with the use of wide angle objectives.

It is the object of the invention to simplify in its production and improve in its reliability the above described pivoting device wherein the support, the operating elements located thereon for adjusting the pivot movement, and the bellow are stationary and essentially only the objective is pivoted therein.

This object is met in such a way that the compensating degree of freedom of the equatorial bearing elements is provided in each case through a pivotability in a bearing element on the holding frame or by a displaceability in a given meridional plane on the objective holder, and that the pivoting adjustment means in each case comprise a cable drive with three cable sections, the first cable section of which is guided from a coil around the adjustment shaft to the first of the bearing elements and the second cable section from this bearing element to a second bearing element that is coaxial to the former, and the third cable section is guided back from it to a second coil around the adjustment shaft of the pivoting adjustment means, and that the two cable sections that act upon one of the bearing elements meet in each case in the given bearing element on its associated swiveling axis in a pivoting region of a bearing shield of the bearing element and are fixed in each case on the bearing shields in an associated manner at one and the other end of an equatorial or meridional guide channel, into which an associated guide deflection roller engages in a guiding manner in each case.

Advantageous Embodiments are Specified in the Subclaims.

Each cable control is provided with at least one cable tensioning means and the cable controls are guided around the spherical-segment shaped objective holder, into which the bearing shields are inserted, by means of deflection rollers in such a way that they meet with the guide channels of the bearing shields approximately tangentially in each case.

The two cable controls are disposed above one another or crossing one another at a height above the holding frame. The upper and lower deflection rollers are mounted in each case on common shafts in such a way that two of the deflection roller pairs in each case are mounted in a corner region of the holding frame and an additional roller is mounted between the lower rollers, at least one of which per cable control is loaded with a cable tension spring or provided with a cable tensioning means.

The guide deflection rollers are grouped together in each case in an assembly together with two associated obliquely mounted deflection rollers, so-called leveling rollers, and held in a bearing block. The shafts of the meridionally oriented guide deflection rollers are fixed on the holding frame, and in a preferred embodiment, to ensure a compensating degree of freedom, the shafts of the equatorial guide deflection rollers are supported on the holding frame in a manner so that they can pivot about the equatorial axis A—A. The bearing elements are protected from twisting relative to the bearing shield in each case by a guide tappet in the guide channel of the bearing shield.

In an alternate embodiment, the compensation movements are ensured in each case by a displacement guidance of the bearing shields in the meridional direction on the objective holder.

During a torsional rotation of the shaft of the associated pivoting means, the one cable end that is being wound up, pulls on the connected end of the bearing shield, causing the second cable section that is located at the other end of the bearing shield to be pulled along, which is fixed to the bearing shield end of the opposed bearing shield and deflects the same in the opposite direction, causing the third cable section that is located at its other bearing shield end to be pulled along, which is being released from the other adjustment shaft coil region in each case through the torsional rotation of the adjustment shaft. During a rotation in the opposite direction the movements are reversed.

Since the bearing shields are inserted into the spherical-segment shaped objective holder, the same is pivoted in one or the other direction by the adjustment of the former that is effected by the cable control. The pivoting movement takes place in the equatorial bearings relative to the holding frame and in the meridional bearings between the bearing shields and the objective holder.

The entire assembly of the adjusting elements and bearing elements is held together in an easy to open manner with a cover frame.

The assemblies and rollers are repetition parts. The cables are unchanged in their lengths, due to the two intersecting locations in each case on the swiveling axis when the crossed axis is pivoted. The movements of the two axes are therefore independent from one another and uniquely associated with the adjustment on the given adjustment shaft.

Since two cable ends act upon one bearing element in each case, all bearings are free from lateral forces. The objective holder "floats" in the cables, which meet in the axes in each case.

Advantageous embodiments are shown in FIGS. 1 through 7.

Figure 1:
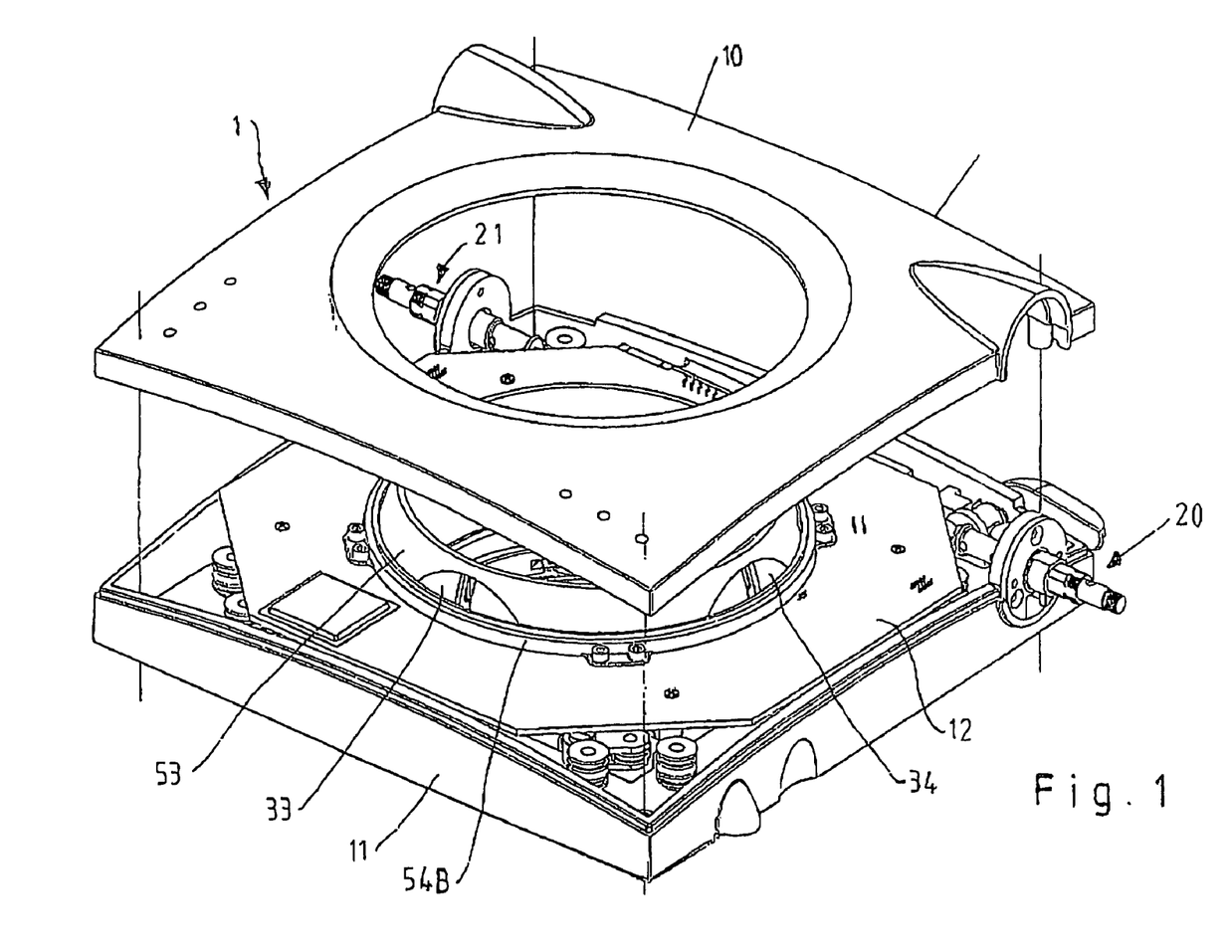
FIG. 1 shows a view in the perspective with the front cover lifted.

FIG. 1 shows a frontal view in the perspective of the pivoting device 1 with the front cover 10 lifted. In the rear housing 11, a holding frame 17 is held, in which the annular objective holder 53 is held with its spherical surface pivotable about two axes. Two of the bearing shields 33, 34, which are located perpendicular to one another with their axes, visibly project with a small section from the front half 54B of the ball-socket bearing half. The bearing shields 33, 34 have a common surface with the objective holder 53 and are embedded within it.

Disposed on the ball socket bearing 54B is a circuit board 12, which carries measuring and control components.

Laterally projecting from the housing 10, 11, are pivoting adjustment shafts 20, 21, which are actuated by means of the pivoting adjustment means, which effect the pivoting of the objective holder.

Figure 2:
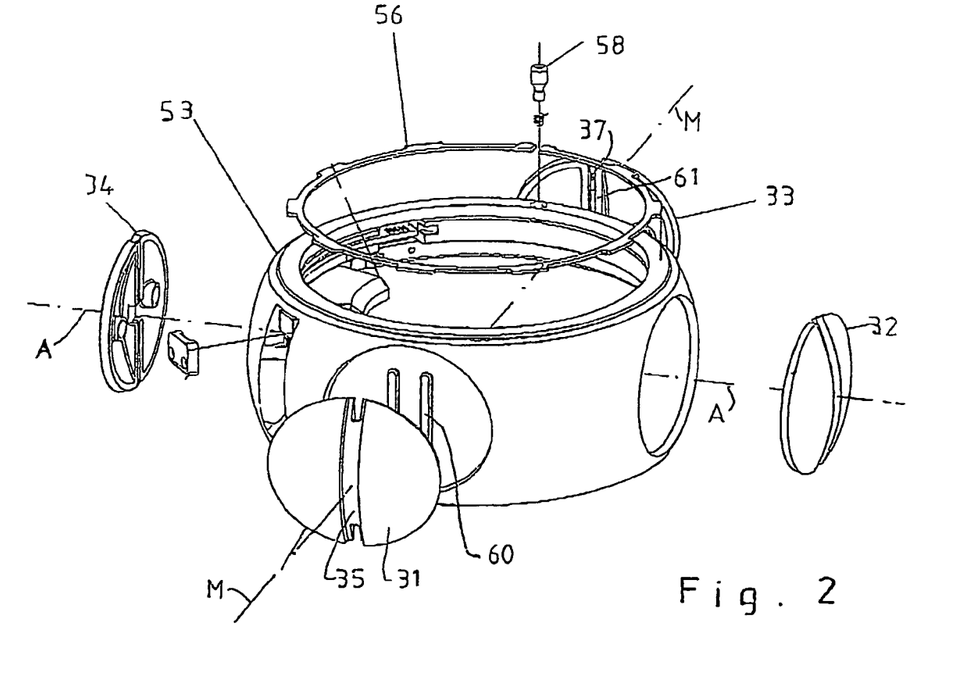
FIG. 2 shows the objective holder in an exploded view.

FIG. 2 shows the objective holder 53, into which an interchangeable objective is insertable, which is held axially with a retaining ring 56, which is removably secured with spring-loaded fasteners 58.

The four bearing shields 31–34 form circular sections of the objective holder 53. Two opposed ones of the bearing shields 31, 33, are held oriented with receptacle skids 60, 61 in the objective holder 53 in such a way that their outer guide channels 35, 37 are oriented perpendicular to a center plane of the objective holder 53. The other two bearing shields 32, 34 are inserted in the objective holder 53 in a manner so that they can rotate freely.

The center axes A—A, M—M of the opposed bearing shields 31, 33; 32, 34 intersect in the optical axis of the objective to be inserted.

Figure 3:
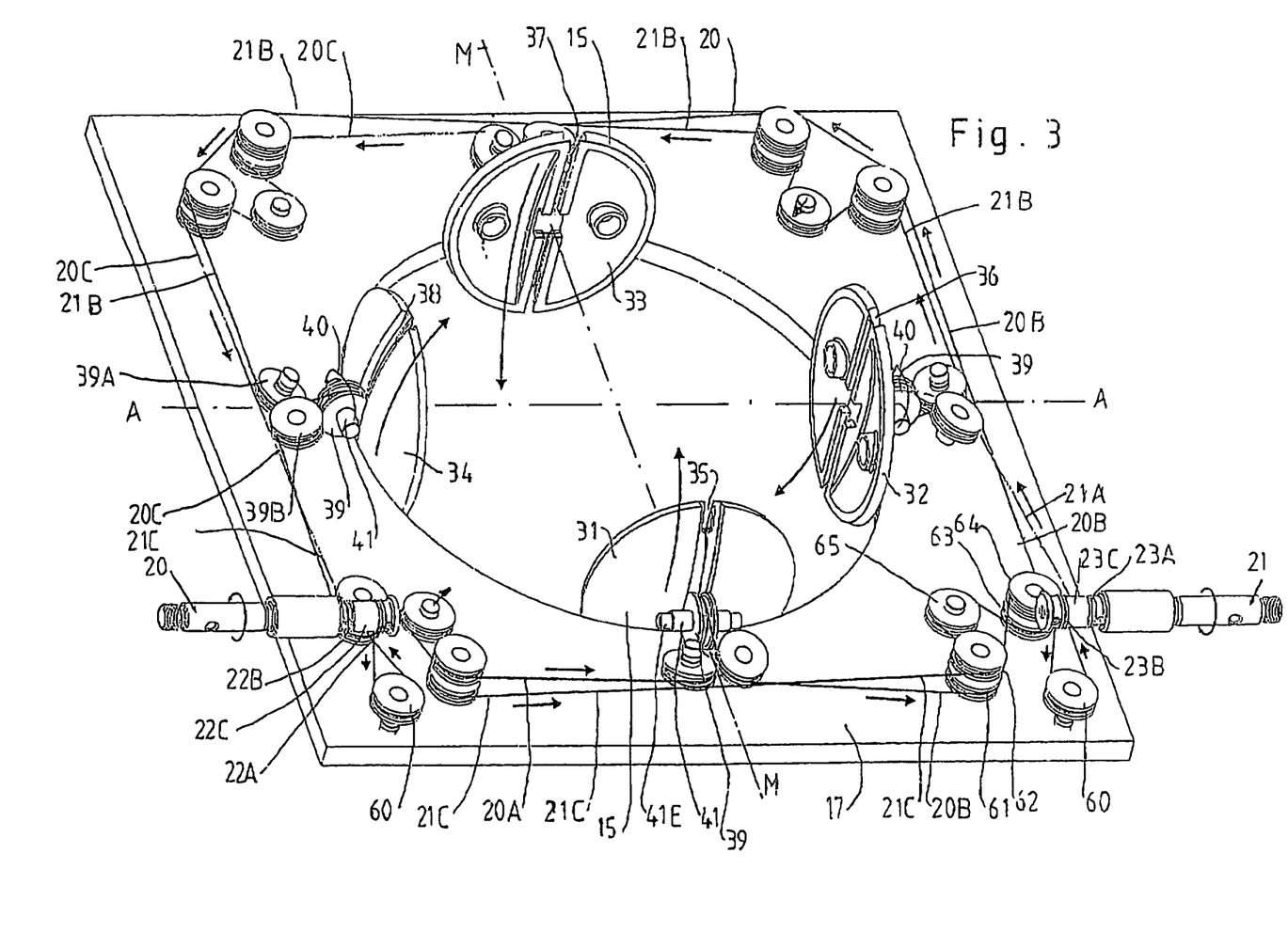
FIG. 3 shows the holding frame with the adjustment and bearing elements.

FIG. 3 shows the holding frame with the adjusting means that pivot the bearing shields 31–34. For both pivot movements about the axes A—A, M—M, cable control assemblies are provided that are identical in principle. The adjustment shafts 20, 21, for example, are disposed coaxially oriented at the bottom or top so that one swiveling axis A—A may be viewed as equatorial and the other axis M—M extends in a meridional plane through the poles.

The adjustment shafts 20, 21 incorporate two cable coils 22A, 22B; 23A, 23B in each case, which are to be wound up or unwound in each case, and are unwound in such a way that the total cable length remains constant. The cable ends exit tangentially and are guided further via rollers 20 so that only a negligible change in cable length occurs when the shafts 20, 21 are rotated torsionally.

In the corner regions of the holding frame, there is an assembly in each case of two double roller holders and a lower offset tension roller 65. The coaxial double rollers 61, 61; 63, 64 hold the two cable systems apart in different planes; however, the cables alternate in each case in their plane along the long distance from corner to corner. At least one of the tension rollers 65 per cable control is loaded with a tension spring so that tolerances that occur due to temperature changes or aging are compensated for.

The two cable controls each consist of three sections 20A–20C; 21A–21C. The first section 20A, 21A starts at the first cable coil 22A, 23A and leads to a first bearing shield 31, 32, where it ends at the upper end of the guide channel 35, 36. From the lower end of the guide channel, the second cable section 20B, 21B extends to the given opposite bearing shield, 33, 34, where it is fixed at the lower guide channel end. From the upper end of this guide channel, 37, 38, the third cable section 20C, 21C extends to the second coil 22B, 23B to the adjustment shaft section 22C, 23.

In front of the bearing shield 31–34, a guide deflection roller 39 is supported in each case, which is guided with its flanks inside the guide channel 35–38. The two cable ends that are fixed in the guide channel in each case overlap there and extend deflected in the channel of the deflection roller 39 by 90° in each case and from there to two leveling rollers 39A, 39B, that are tangentially in alignment in their circumferences, which are mounted obliquely such that the two cable ends enter and exit approximately in alignment. In this manner the entering and exiting cable ends intersect in front of and behind the guide deflection roller 39 in each case, approximately on the given swiveling axis A—A, M—M that permeates the bearing.

Two bearing types 15, 40, are provided, one of which are the meridional bearings 15, wherein the pivoting of the objective holder takes place about the shields 31, 33, and the shaft 41 of the guide roller 39 is rotatably supported on the holding frame 17.

The other bearing type 40 permits a pivoting of the objective holder about the equatorial axis A—A in such a way that the guide roller 39 pivots along in a bearing 40.

The two bearing types 15, 40 on the two axes A—A, M—M, convey to the objective holder the degrees of freedom that it needs for the independent pivoting movements.

Figure 4:
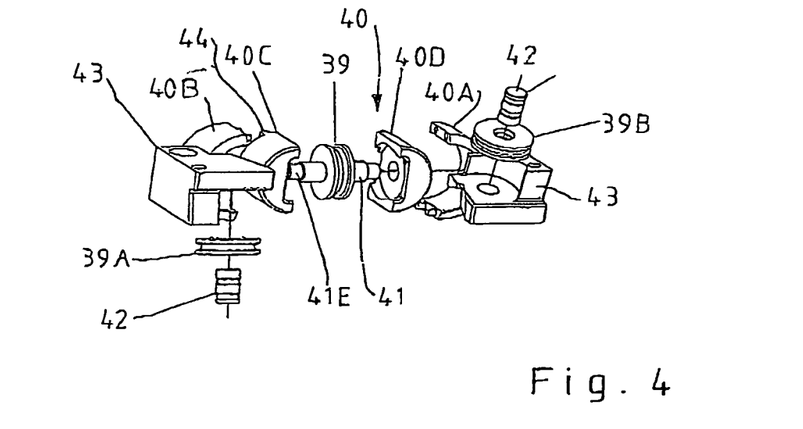
FIG. 4 shows a bearing element in an exploded view.

The four deflection assemblies 39, 99A, 39B with the bearing 40 are designed essentially identical, as shown by FIG. 4 in an exploded view.

In the two bearing blocks 43, the leveling rollers 39A, 39B are mounted obliquely on shafts 42 locked in grooves. On the two bearing blocks 43, one complementary half-round bearing shell 40A, 40B is located, in which inner bearing halves 40C, 40D are supported. The bearing shells 40A–40C have transversal bores in which the guide deflection rollers 39 are rotatably supported on the shaft 41. In the meridional bearing elements 15, FIG. 3, the bearing elements 40 are prevented in each case by overlength shaft ends 41E on the shaft 41 from pivoting into the outer bearing shells 40A, 40B.

The bearing element 40C incorporates a guide tappet that engages in the guide channel of the bearing shield besides the guide deflection roller 39.

The two assemblies of the different swiveling axes A—A, M—M thus differ, from a structural point of view, only in the type of shaft 41.

Figure 5:
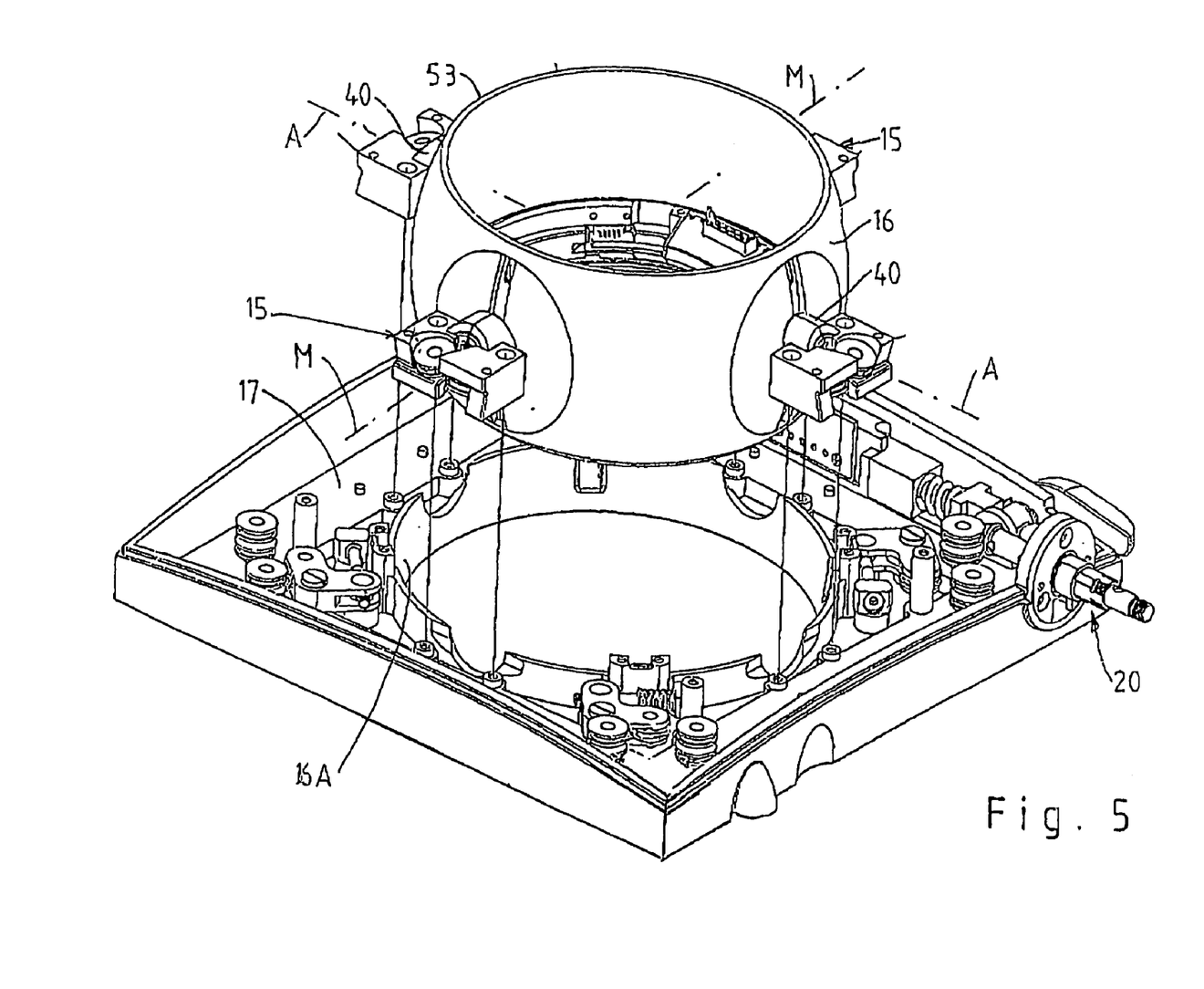
FIG. 5 shows the assembly of the objective holder.

FIG. 5 shows the assembly of the objective holder 53 with the bearings 15, 40 on the holding frame 17. The objective holder 53 is held in these bearings and the spherical surface 16, as well as the complementary spherical casing sections 16A have only a loose fit and are not bearing elements.

Figure 6:
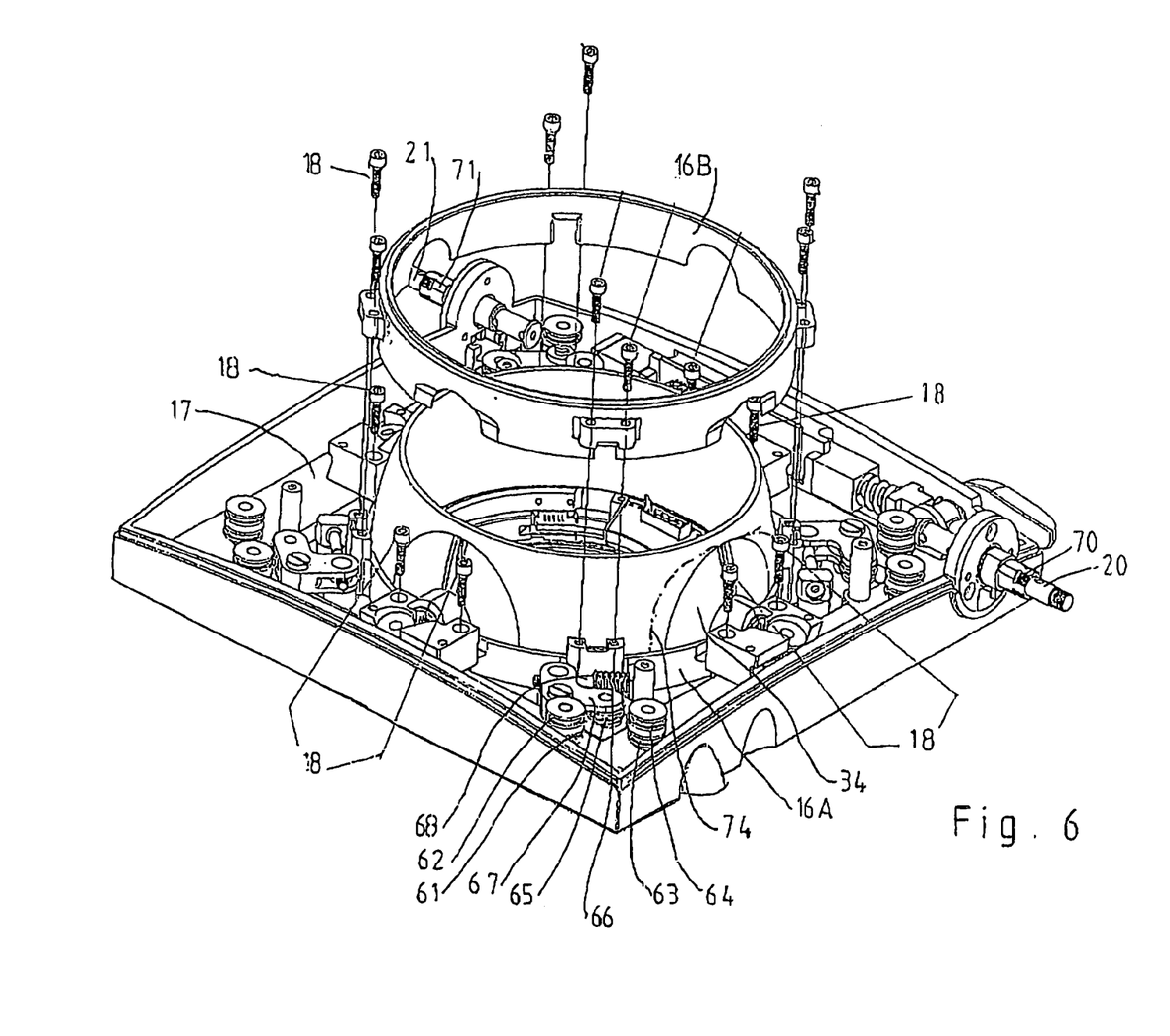
FIG. 6 shows the objective holder being enclosed.

FIG. 6 shows the objective holder 53 already mounted into the holding frame 17 and the mounting screws 18 for it, and also for the assembly of the front spherical casing section 16B.

In the figure, in the front corner region of the holding frame 17, one can see belt tensioning means with the tension roller 65, which is loaded by the tension spring 66 via angle levers 67, the pretension of which is adjustable by means of an adjusting screw 68. Located diagonally opposite is an additional cable tensioning means of identical design for the second cable system. The other roller assemblies in the two additional corner regions are assembled with only the adjusting screw without a spring.

The pivoting by means of the cable controls gives the designer great freedom with regard to the arrangement of the adjustment shafts 20, 21, which may be placed in any direction. Turning knobs and/or adjusting motors may be connected to it as well.

For controlling or regulating the adjustment, position transmitters are provided in the form of magneto-sensoric zero position transmitters in the region of the bearing shields and incremental transmitters 70, 71 on the adjustment shafts 20, 21.

The alternate embodiment of the degree of freedom for the compensation movement is shown in a dot-and-dash pattern on the objective holder 53 for the equatorial bearing shield 15, which, like the diametrical bearing shield, is supported accordingly in a guide recess 73 not only rotatable but also displaceable on the circumference of the objective holder. In that case, no pivot bearings are provided on the holding frame, thus rendering these assemblies simplified.

Figure 7:
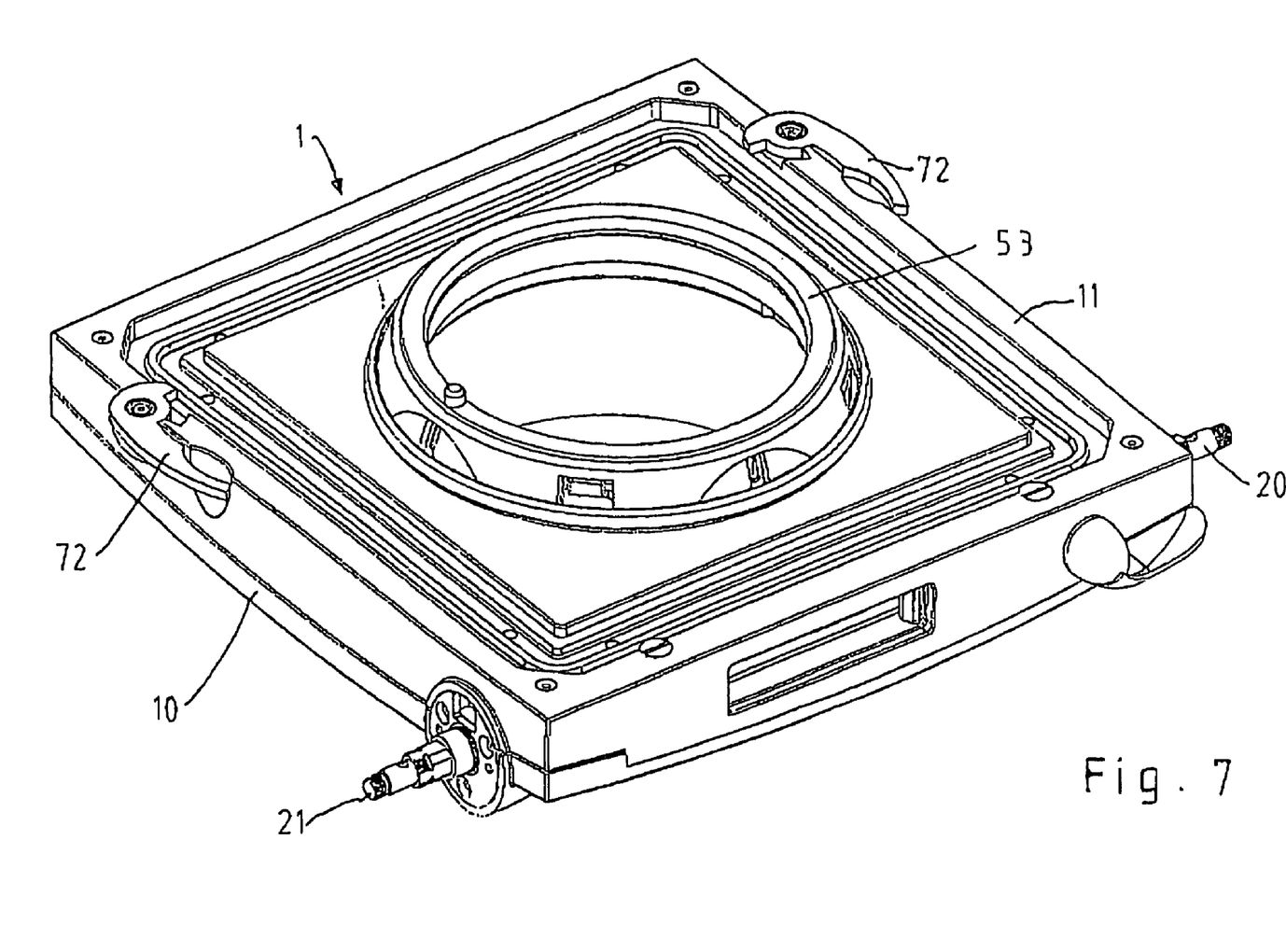
FIG. 7 shows the bellow connection side of the pivoting device.

FIG. 7 shows the rear of the pivoting device 1 with the connecting profile for the bellow, the edge of which is to be fixed in an easily removable manner with eccentric levers.

The bearing blocks, as described above, are repetition parts, however, this time they are implemented diametrically opposed mirror-inverted relative to the cable guidance. If the same is now reversed, the direction of movement of the objective holder relative to the direction of rotation of the adjustment shaft changes.

In the example, one tension spring is provided in each case per cable control, and an adjusting frame without tensioning spring. This permits a centering of the position of the objective holder in a fixed relation to the support plate with the rigidity of the cable in the pull direction towards the bearing block on one hand and the elasticity of the spring in relation to the adjustment shaft on the other hand. If two springs are used per cable control, this produces a greater flexibility for the position of the objective holder when there is an external force acting upon it. It offers protection against a tearing of the cable, however, in that case it is recommended that progressively acting springs be used and/or indicators be mounted on the spring supports that signal any impermissible threshold deflections. The threshold signals from the indicators are routed to the circuit board, which is mounted on the support plate with a connection plug.

A plug connection is also provided on the objective holder towards the objective, so that characteristics of the objective that are stored electronically readable or which are readable from it can be supplied to the electronics on the circuit board.

List of Reference Numerals:
A—A; M—M Swiveling Axes
1 Pivoting Device
10 Front Cover
11 Rear Cover
12 Circuit Board
15 Bearing Elements
16 Spherical Surface
16A, 16B Spherical Casing Segments
17 Holding frame
18 Screws
20, 21 Pivoting Adjustment Means
20–20C 3 Cable Sections
21A–21C 3 Cable Sections
22A, 23A $1^{st}$ Adjustment Shaft Coil
22B, 23B $2^{nd}$ Coil
22C, 23C Adjustment Shaft Sections
31–34 Bearing Shields
35–38 Guide Channel
39 Guide Deflection Roller
39A, 39B Leveling Rollers
40 Bearing Elements
40A, 40B Bearing Shells
40C, 40D, Inner Bearing Halves
41 Shaft for 39
41E Shaft End Sections
42 Shafts for 39A, 39B
43 Bearing Blocks
44 Guide Tappet
53 Objective Holder
54A,B Ball Socket Bearings
56 Retaining Ring
58 Fasteners
60 Deflection Rollers
61–64 Deflection Rollers
65 Tension Roller
66 Tension Spring
67 Angle Lever
68 Adjusting Screw
70,71 Incremental Angle Transmitter
72 Eccentric Levers
73 Guide Recess

What is claimed is:

1. An objective pivoting device (1) for pivoting an objective concentrically arranged therein, about two mutually perpendicular axes (A—A; M—M) that cross at a point of intersection on the optical axis of the objective, wherein the objective is held in an objective holder (53) and the same is supported pivoting in bearings (15, 40) in two degrees of freedom of a spherical surface (16) and these bearings (15, 40) are disposed on a stationary holding frame (17) on which two pivoting adjustment means (20, 21) are provided, one of which is operatively linked with meridionally diametrical bearing elements (15), and the other one with equatorially diametrical bearing elements (15) of the objective holder (53) in each case, and wherein the latter have a compensating degree of freedom, characterized in that the compensating degree of freedom of the equatorial bearing elements (15) is provided in each case through a pivotability in a bearing element (40) on the holding frame or by a displaceability in a given meridional plane on the objective holder (53) and that the pivoting adjustment means (20, 21) in each case comprise a cable drive with three cable sections (20A–20C; 21A–21C), the first cable section (20A; 21A) of which is guided from a coil around the adjustment shaft (22A; 23A) to the first of the bearing elements (15, 40) and the second cable section (20B, 21B) from this bearing element to a second bearing element (15, 40) that is coaxial to the former, and the third cable section (20C, 21C) is guided back from it to a second coil (22B, 23B) around the adjustment shaft (22C, 23C) of the pivoting adjustment means (20, 21), and that the two cable sections (20A, 20B; 20B, 20C; 21A, 21B; 21B, 21C) that act upon one of the bearing elements (15, 40) meet in each case in the given bearing element on its associated swiveling axis (A–M, M–A) in a pivoting region of a bearing shield (31–34) of the bearing element and are fixed on the bearing shields (31–34) in each case in an associated manner at one and the other end of an equatorial or meridional guide channel, into which a guide deflection roller (39) engages in a guiding manner in each case.

2. The objective pivoting device of claim 1, characterized in that the guide deflection rollers (39) of the meridional swiveling axis (M—M) are supported on the holding frame (17) only rotatable and the other guide rollers (39) are supported rotatable and pivotable about the equatorial axis (A—A) in the bearing elements (40), or the associated bearing shields (32, 34) are held displaceable in the meridional direction in guide recesses (74) in the objective holder (53).

3. The objective pivoting device of claim 2, characterized in that the bearing elements (40) consist of outer and inner bearing shells (40A, 40B; 40C, 40D) that are fixed with bearing blocks (43) on the holding frame (17) in each case.

4. The objective pivoting device of claim 3, characterized in that the inner bearing shells (40C, 40D) incorporate support bores for supporting a shaft (41) of the guide deflection roller (39).

5. The objective pivoting device of claim 3, characterized in that at least the outer bearing shells (40A, 40B) contains a bore coaxial to inner support bores, into which one shaft end (41E) of a shaft (41) projects when the bearing elements (40A–40D) are fixed relative to one another.

6. The objective pivoting device of claim 3, characterized in that in the two bearing blocks (43) located away from the respective bearing shield (31–34), one leveling roller (39A, 39B) is disposed in each case slanted toward the other one and toward the holding frame (17) in such a way that the cable that is guided over the same and exiting tangentially, meets the guide deflection roller, and tangentially meets the other cable on the given swiveling axis (M—M, A—A).

7. The objective pivoting device of claims 3, characterized in that at least one of the inner bearing shells (40C, 40D) carries a guide tappet (44) that guidingly engages into a guide channel (35–38).

8. The objective pivoting device of claim 1, characterized in that in each corner region of the holding frame (17) three deflection rollers (61, 63, 65) are disposed offset from one another and the one in the center is a tension roller (65) that is supported inside an angle lever (67), which has an adjusting screw (68) acting upon its other side.

9. The objective pivoting device of claim 8, characterized in that in each cable control (20A–20C; 21A–21C) at least one of the adjusting screws (68) acts upon the angle lever (67) via a tension spring (66).

10. The objective pivoting device of claim 8, characterized in that on the shafts of the stationary deflection rollers (61, 63) an additional deflection roller (62, 64) is supported coaxially in each case, over which the given other cable control is guided.

11. The objective pivoting device of claim 1, characterized in that a deflection roller (60) is disposed near the adjustment shaft coil (22B, 23B) in each case, in such a way that the deflected cable (20C, 21C) extends tangentially to the adjustment shaft (20, 21).

12. The objective pivoting device of claim 1, characterized in that the adjustment shafts (20, 21) carry an incremental angle transmitter (70, 71) in each case, and at least two zero position indicators are directly or indirectly disposed on the objective holder (53).

13. The objective pivoting device of claim 1, characterized in that the objective holder (53) is held centered in the bearing shields (31–34) on the cable controls (20A–20C; 21A–21C) and disposed in a loose fit in annular ball socket bearings (54A, 54B), one of which is disposed on the support plate (17).

14. The objective pivoting device of claim 12, characterized in that the incremental angle transducers (70, 71) and zero indicators are connected to a contact unit, to which a circuit board (12) is connected by means of contacts, said circuit board (12) being disposed on the holding frame (17) in front of the pivoting adjustment means (20, 21).

15. The objective pivoting device of claim 1, characterized in that the holding frame (17) is disposed in a rear housing (11), which incorporates a bellow connection channel and eccentric levers (72) to fix the bellow.

16. The objective pivoting device of claim 15, characterized in that the rear housing (11) is covered with a front cover (10) so that a circuit board (12) and the holding frames (17) with the adjusting and bearing elements (40) are enclosed therein, with the objective holder (53) projecting with its edge regions from a circular opening.

17. The objective pivoting device of claim 1, characterized in that the objective holder (53) carries at its front, inside an annular channel, a retaining ring (56) that is openable with a spring-loaded fastener (58) to exchange the objective.

* * * * *